US012784297B2

(12) United States Patent
Rughwani et al.

(10) Patent No.: US 12,784,297 B2
(45) Date of Patent: Nov. 3, 2026

(54) SYSTEMS AND METHODS FOR GENERATING IMAGES OF LOCATIONS AFFECTED BY WEATHER CONDITIONS

(71) Applicant: YAHOO ASSETS LLC, New York, NY (US)

(72) Inventors: Dipen Rughwani, Cupertino, CA (US); Joao Vitor Baldini Soares, New York, NY (US)

(73) Assignee: YAHOO ASSETS LLC, New York, NY (US)

( * ) Notice: Subject to any disclaimer, the term of this patent is extended or adjusted under 35 U.S.C. 154(b) by 150 days.

(21) Appl. No.: 18/480,623

(22) Filed: Oct. 4, 2023

(65) Prior Publication Data

US 2025/0117976 A1 Apr. 10, 2025

(51) Int. Cl.
*G06F 16/587* (2019.01)
*G06T 11/10* (2026.01)
*G06T 13/80* (2011.01)

(52) U.S. Cl.
CPC ............ *G06T 11/10* (2026.01); *G06F 16/587* (2019.01); *G06T 13/80* (2013.01)

(58) Field of Classification Search
CPC ......... G06N 3/08; G06T 11/001; G06T 13/80; G09G 5/02; G06F 16/587
See application file for complete search history.

(56) References Cited

U.S. PATENT DOCUMENTS 9,405,741 B1 * 8/2016 Schaaf .................... G10L 13/00
11,756,567 B2 * 9/2023 Wilson ................... G06N 3/045 704/235
2016/0309299 A1 * 10/2016 Chu ...................... G06F 3/0485
2019/0392596 A1 * 12/2019 Yang .................... G06V 20/188
2021/0027748 A1 * 1/2021 Jang .......................... G06T 5/90
2024/0135509 A1 * 4/2024 Liu ........................... G06T 5/77
2024/0144565 A1 * 5/2024 Alkalay .................. G06T 11/60
2024/0282131 A1 * 8/2024 Ren .................... G06V 10/7753
2025/0085131 A1 * 3/2025 Dasher .............. G01C 21/3626

* cited by examiner

*Primary Examiner* — Antonio A Caschera
(74) *Attorney, Agent, or Firm* — James J. DeCarlo; Greenberg Traurig, LLP

(57) ABSTRACT

In some implementations, a method includes: (i) identifying, by a processor, a geographic location and a current time, (ii) retrieving, by the processor from a database, a weather condition of the geographic location at the current time, (iii) retrieving, by the processor from an image database, an image based on the geographic location, (iv) creating, via a generative machine learning model executed by the processor that takes the image of the geographic location and the weather condition as input, a digital image depicting the geographic location being visibly affected by the weather condition, and (v) causing display, by the processor, of the digital image in an application.

17 Claims, 6 Drawing Sheets

SYSTEMS AND METHODS FOR GENERATING IMAGES OF LOCATIONS AFFECTED BY WEATHER CONDITIONS

BACKGROUND

Many users use weather applications to check the current and upcoming weather in their local area or in other locations. These weather applications may include various information such as the temperature, humidity, wind speed, cloud cover, and any current weather events happening such as a thunderstorm. In some implementations, a weather application may display an image of the location for which the weather data is being displayed. However, these images typically do not reflect the current weather at the location and are often limited to stock photos which may not accurately depict the location.

DETAILED DESCRIPTION

Figure 1:
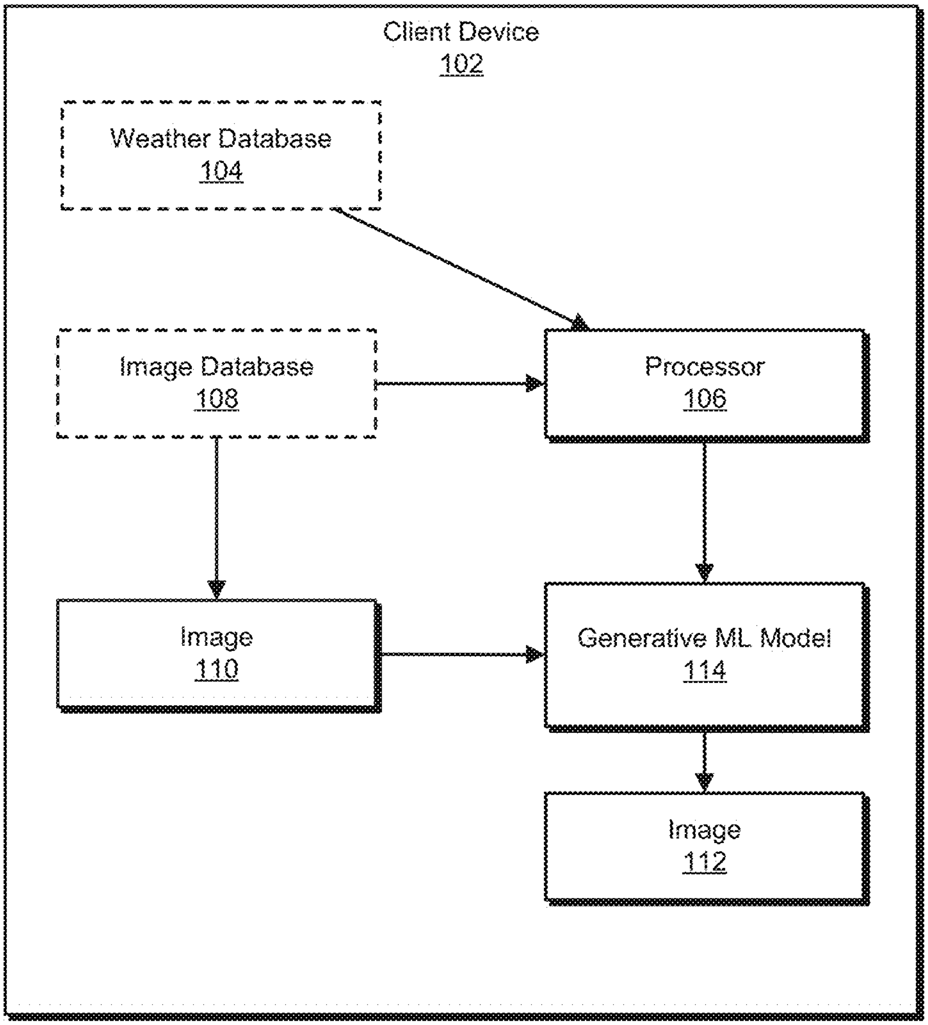
FIG. 1 is a block diagram illustrating a system for generating images of locations affected by weather conditions according to some of the example embodiments.

The instant disclosure describes systems and methods for generating images of locations affected by weather conditions. Various machine learning (ML) models are capable of generating images. One example of such a model is a generative ML model. Generative ML models, often underpinned by Generative Adversarial Networks (GANs) or diffusion models as well as text-based transformer models, are trained on massive datasets of images and text prompts and can be used to generate images of various sizes and styles in response to text and/or image-based prompts. Generative ML models are typically composed of a neural network with many parameters (typically billions of weights or more). For example, a generative ML model may use a GAN to analyze training data and/or image inputs. In some implementations, a generative ML model may use multiple neural networks working in conjunction.

The example embodiments describe methods, computer-readable media, device, and systems that use a generative ML model to accomplish various tasks. In some implementations, the described method may use a generative ML model to modify an image of a location to show a depiction of the location affected by a specific weather condition. In one example, the method may identify a location and the current weather at the location and then use the generative ML model to produce an image of the location being affected by the current weather. In one implementation, the generative ML model may account for time of year, time of day, and/or other factors when generating the image. Additionally, or alternatively, the method may modify the background of a participant in a video conference by generating a new background via the generative ML model. In one implementation, the generative ML model may match the lighting conditions or other conditions of the participant to create a more seamless blend with the background.

In some implementations, the techniques described herein relate to a method including: (i) identifying, by a processor, a geographic location and a current time, (ii) retrieving, by the processor from a database, a weather condition of the geographic location at the current time, (iii) retrieving, by the processor from an image database, an image based on the geographic location, (iv) creating, via a generative machine learning model executed by the processor that takes the image of the geographic location and the weather condition as input, a digital image depicting the geographic location being visibly affected by the weather condition, and (v) causing display, by the processor, of the digital image in an application.

In some implementations, the techniques described herein relate to a method, where the generative machine learning model is configured to receive structured input that comprises the weather condition.

In some implementations, the techniques described herein relate to a method, where the structured input comprises a specified day of the year and a specified time of day.

In some implementations, the techniques described herein relate to a method, where the structured input comprises a specified color palette.

In some implementations, the techniques described herein relate to a method, where creating, via the generative machine learning model executed by the processor that takes the image of the geographic location and the weather condition as input, the digital image comprises performing at least one automatic prompt engineering step that outputs a prompt in a predefined structured format to be provided to the generative machine learning model as input.

In some implementations, the techniques described herein relate to a method, where creating the digital image comprises creating a cartoon version of the digital image.

In some implementations, the techniques described herein relate to a method, where creating the digital image comprises creating an animated version of the digital image.

In some implementations, the techniques described herein relate to a method wherein retrieving the image based on the geographic location comprises querying locally stored images related to the geographic location.

In some implementations, the techniques described herein relate to a method, wherein creating, via the generative machine learning model executed by the processor that takes the image of the geographic location and the weather condition as input, the digital image, comprises constraining the generative machine learning model to avoid offensive output.

In some implementations, the techniques described herein relate to a non-transitory computer-readable storage medium for tangibly storing computer program instructions capable of being executed by a computer processor, the computer program instructions defining steps of: (i) identifying, by a processor, a geographic location and a current time, (ii) retrieving, by the processor from a database, a weather condition of the geographic location at the current time, (iii) retrieving, by the processor from an image database, an image based on the geographic location, (iv) creating, via a generative machine learning model executed by the processor that takes the image of the geographic location and the weather condition as input, a digital image depicting the geographic location being visibly affected by the weather condition, and (v) causing display, by the processor, of the digital image in an application.

In some implementations, the techniques described herein relate to a non-transitory computer-readable storage medium, where the generative machine learning model is configured to receive structured input that comprises the weather condition.

In some implementations, the techniques described herein relate to a non-transitory computer-readable storage medium, where the structured input comprises a specified day of the year and a specified time of day.

In some implementations, the techniques described herein relate to a non-transitory computer-readable storage medium, where the structured input comprises a specified color palette.

In some implementations, the techniques described herein relate to a non-transitory computer-readable storage medium, where creating, via the generative machine learning model executed by the processor that takes the image of the geographic location and the weather condition as input, the digital image comprises performing at least one automatic prompt engineering step that outputs a prompt in a predefined structured format to be provided to the generative machine learning model as input.

In some implementations, the techniques described herein relate to a non-transitory computer-readable storage medium, where creating the digital image comprises creating a cartoon version of the digital image.

In some implementations, the techniques described herein relate to a non-transitory computer-readable storage medium, where creating the digital image comprises creating an animated version of the digital image.

In some implementations, the techniques described herein relate to a non-transitory computer-readable storage medium, further including receiving, via the application, an image based on the geographic location and adding the image of the geographic location to the image database.

In some implementations, the techniques described herein relate to a non-transitory computer-readable storage medium, wherein creating, via the generative machine learning model executed by the processor that takes the image of the geographic location and the weather condition as input, the digital image, comprises constraining the generative machine learning model to avoid offensive output.

In some implementations, the techniques described herein relate to a device including: a processor; and a storage medium for tangibly storing thereon logic for execution by the processor, the logic including instructions for: (i) identifying, by a processor, a geographic location and a current time, (ii) retrieving, by the processor from a database, a weather condition of the geographic location at the current time, (iii) retrieving, by the processor from an image database, an image based on the geographic location, (iv) creating, via a generative machine learning model executed by the processor that takes the image of the geographic location and the weather condition as input, a digital image depicting the geographic location being visibly affected by the weather condition, and (v) causing display, by the processor, of the digital image in an application.

In some implementations, the techniques described herein relate to a device, where the generative machine learning model is configured to receive structured input that comprises a specified geographic location and a specified weather condition.

FIG. 1 is a block diagram illustrating a system for generating images of locations affected by weather conditions according to some of the example embodiments.

The illustrated system includes a client device 102. Client device 102 may include a processor 106 that identifies a geographic location and a current time. In one implementation, processor 106 may retrieve a weather condition at the current time from a weather database 104. Although illustrated as part of client device 102, in some implementations, weather database 104 may be hosted on a separate device, such as a server. In one implementation, processor 106 may retrieve an image 110 from an image database 108. Although illustrated as part of client device 102, in some implementations, image database 108 may be hosted on a separate device, such as a server. After retrieving image 110, processor 106 may create, via a generative ML model 114, an image 112 depicting the geographic location being visibly affected by the weather condition. Processor 106 may then display image 112 in an application (e.g., on client device 102, or by transmitting image 112 to a separate device for display). Although illustrated here on client device 102, any or all of the systems described herein may be hosted by one or more servers and/or cloud based processing resources. Further details of these components are described herein and in the following flow diagrams.

In the various implementations, client device 102, processor 106, and generative ML model 114 can be implemented using various types of computing devices such as laptop/desktop devices, mobile devices, server computing devices, etc. In one implementation, client device 102 may represent a mobile device such as a mobile phone. Alternatively, client device 102 may represent a backend device that receives data from and sends data to a client device such as a mobile phone. Specific details of the components of such computer devices are provided in the description of FIG. 6 which are not repeated herein. In general, these devices can include a processor and a storage medium for tangibly storing thereon logic for execution by the processor. In some implementations, the logic can be stored on a non-transitory computer readable storage medium for tangibly storing computer program instructions. In some implementations, these instructions can implement some of all of the methods described in FIG. 2 and FIG. 4.

In some implementations, the weather database 104 can comprise any source of data about current weather in one or more locations. In some implementations, the method may access weather database 104 via an application programming interface (API). In one implementation, weather database 104 may be hosted on one or more servers. In some implementations, weather database 104 may take a geographic location as a query parameter (e.g., global positioning system coordinates, a street address, etc.) and return the current weather for that location. In one implementation, weather database 104 may return results that are updated continuously. In other implementations, weather database 104 may be updated at intervals (e.g., every minute, every ten minutes, etc.).

The method may retrieve various weather condition information from weather database 104 including, without limitation, temperature, barometric pressure, humidity, cloud cover, precipitation, wind speed, wind direction, perceived temperature, air quality, ultraviolet index, visibility, sunrise time, and/or sunset time.

In some implementations, the image database 108 can comprise any source of images for one or more location. In one implementation, image database 108 may take a geographic location as a query parameter and return one or more images of the location. In some implementations, the geographic location may be broad, such as a city or state. For example, a query for an address within San Francisco near City Hall may return an image of the Golden Gate Bridge. Additionally, or alternatively, image database 108 may be capable of returning accurate image results for a more specific geographic location, such as a zip code or a street address. For example, a query for an address within San Francisco near City Hall may return an image of San Francisco City Hall. In some implementations, image database 108 may be a database stored on one or more servers. Additionally, or alternatively, image database 108 may include one or more images stored locally, such as photos of locations stored on the user's phone.

In some implementations, the image 110 can comprise a photo of a location. In some implementations, image 110 may be a public domain photo. Alternatively, image 110 may be a photo to which the user and/or the publisher of the application implementing the method owns the rights. In some implementations, image 110 may be tagged with metadata that includes the location at which image 110 was taken and/or landmarks that image 110 depicts. In some examples, image 110 may include additional metadata, such as the date and/or time that image 110 was taken.

Figure 2:
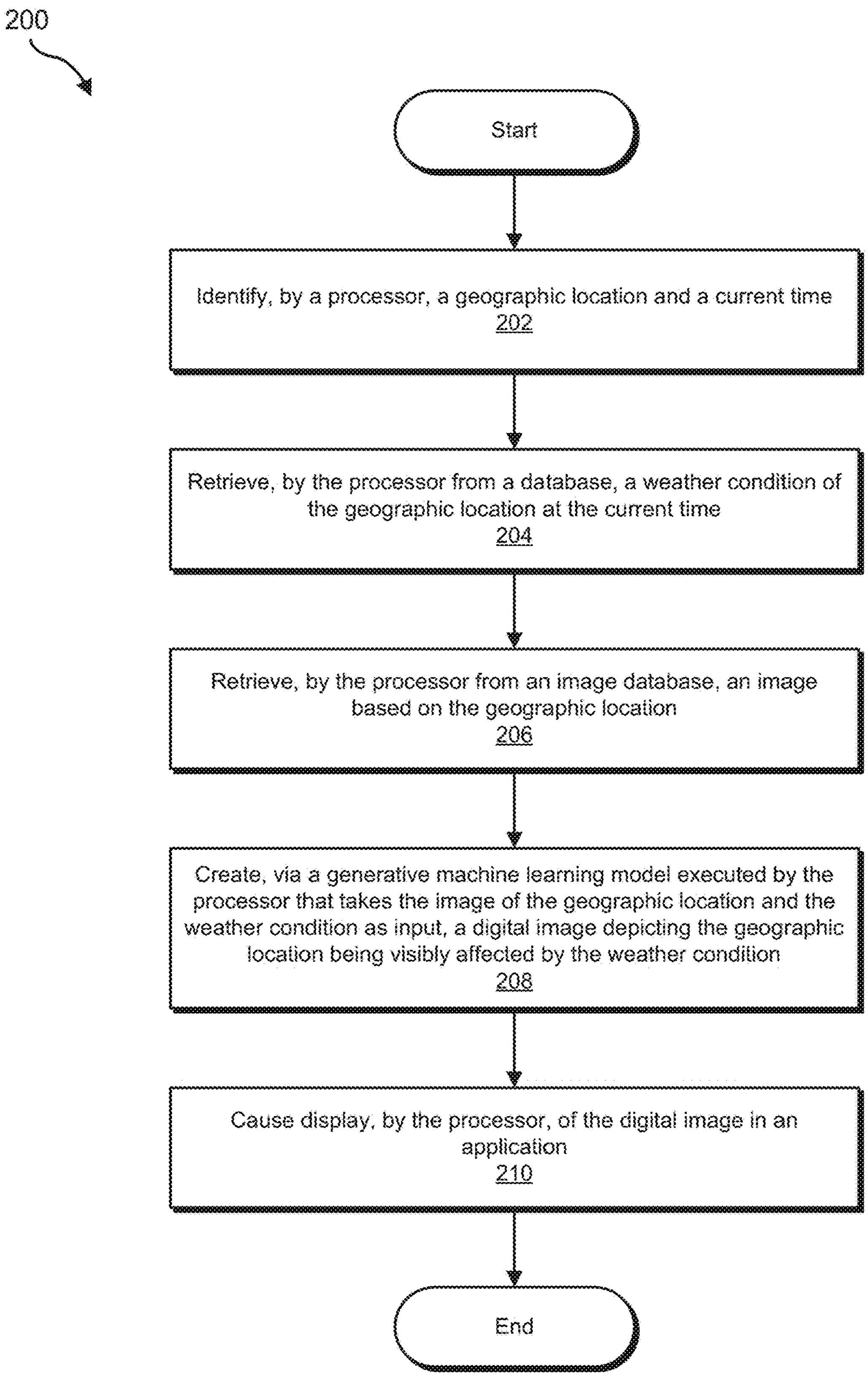
FIG. 2 is a flow diagram illustrating a method for generating images of locations affected by weather conditions according to some of the example embodiments.

FIG. 2 is a flow diagram illustrating a method 200 for generating images of locations affected by weather conditions according to some of the example embodiments.

In step 202, the method can include identifying, by a processor, a geographic location and a current time.

In some implementations, the method may identify a geographic location that is a street address. Additionally, or alternatively, the method may identify a global positioning system (GPS) location, a zip code, a city, and/or any other relevant type of geographic location. In some implementations, the method may identify the geographic location via input from a location sensor of a device configured with a weather application. For example, the method may identify the geographic location based on the GPS sensor of a mobile device displaying a weather app that implements the method. Alternatively, the method may identify a geographic location by receiving user input specifying a geographic location. For example, a user located in San Francisco may request weather information for Boston. In this example, the method may identify the geographic location of Boston despite the device being located in San Francisco.

In one implementation, the method may identify a current time via the system clock of a device or a synchronized server time. For example, the method may identify the current time based on the system clock of a mobile device displaying a weather app that implements the method. Alternatively, or in conjunction with the foregoing, the method can utilize a future time if, for example, the user is requesting weather information for a future time. In some implementations, the time can be represented via a timestamp, time delta, UNIX timestamp, or similar time value.

In step 204, the method can include retrieving, by the processor from a database, a weather condition of the geographic location at the current time.

In some implementations, the method may perform an API call to retrieve the weather condition from the weather database. For example, the method may provide the geographic location and/or current time as input and may receive the weather condition of the geographic location at the current time as output. In some implementations, the API response may comprise a structured response (e.g., XML or JSON response) to enable further processing.

In step 206, the method can include retrieving, by the processor from an image database, an image based on the geographic location.

In some implementations, the method may perform an API call to retrieve the image from the image database. For example, the method may provide the geographic location as a parameter to the API call. In some implementations, the method may further provide the current time of day and/or time of year to reduce the amount of processing in step 208. In some implementations, the method can alternatively convert the geographic location and current time into keywords and/or vector embeddings to search a database of images. For example, the input of a latitude and longitude 42.365009576990296, −71.0557588019058 and time of 1692379318221 can be converted into the keywords "boston," "north end," "noyes place," "suffolk county," and "afternoon." In some implementations, the method can use a mapping service or similar reverse geocoding API to convert the latitude and longitude into a list of potential keywords. For example, the API can comprise an OPEN STREETMAP® API which can provide geographic details for the latitude and longitude pairs. Relatedly, the method can convert a time value ("1692379318221") into a textual description of the time. For example, a 24-hour period can be segmented into time intervals associated with keywords ("early morning", "morning," "afternoon," "evening," etc.). Other keyword techniques can be used, for example, identifying holidays (e.g., "labor day"), special events ("marathon"), etc. based on the current day or time. In some implementations, a range of days or time before or after the timestamp can also be used to generate keywords.

In some examples, the method may receive multiple images from the database and may select an image based on time of day, proximity to the geographic location, visibility of landmarks depicted in the image, and/or other parameters. In some implementations, the method may rotate through different images of the same geographic location so that the user is presented with a different landmark or view of a landmark each time.

Additionally, or alternatively, the method may retrieve an image from a mobile device executing the method. For example, the method may retrieve an image from an image gallery on the mobile device that has metadata indicating the image was taken at the geographic location.

In step 208, the method can include creating, via a generative ML model executed by the processor that takes the image of the geographic location and the weather condition as input, a digital image depicting the geographic location being visibly affected by the weather condition.

The digital image may be visibly affected by the weather condition in a variety of ways. For example, rain, fog, or clouds may be visible in the digital image. In another example, plants may be visibly bent as if blown by a strong wind even if the high wind speed is not directly visible. No limit is placed on the number and type of modifications to the image of the geographic location.

In some implementations, the generative ML model may be configured to take input in a specific structure in addition to or in place of taking input in the form of variably structured prompts. For example, the generative ML model may be configured to take as input an image and a set of keyword-value pairs with keywords such as weather condition, time of day, and/or time of year.

| Example Key-Value Pairs: |
|---|
| {Weather Condition: Rainy; Time of Day: 20:00; Date: August 8} |

In one implementation, the generative ML model may take a specified color palette as input. In some example, the generative ML model may take a set of RGB and/or hexadecimal color values as input and may produce as output an image that is entirely in and/or is skewed towards those color values. For example, the model may take a set of color values that are part of a brand identity for a weather app and may produce an image that matches the weather app. In another example, the model may take a set of color values that are associated with a specific weather condition (e.g., dark blues and grays for a rainy day) that may assist the model in producing an image that depicts the weather condition.

Additionally, or alternatively, the method may include an automatic prompt engineering step that creates a prompt to provide to the generative ML model as input. For example, an algorithm such as a large language model may receive input information that includes the weather condition, time of day, time of year, and/or color palette and may output a prompt that the method provides as input to the generative ML model alongside the image. In one implementation, the algorithm may calculate lighting conditions based on date, time of day, and/or weather condition. In some implementations, the method use an algorithm may analyze the provided image for the lighting and/or weather conditions in the image to determine what modifications are required to match the current lighting and/or weather conditions.

Example Data: San Francisco, cloudy, 40% humidity, 50 degrees Fahrenheit, wind 3 knots southwest, 8:30 pm, August 8th, image of the Golden Gate Bridge on a clear day in bright sunshine Example Prompt: Edit attached image with clouds, overcast, dim, low light, twilight, dusk, shadows, realistic, photograph, high resolution In some examples, the generative ML model may edit the image to incorporate the weather condition as well as match the lighting conditions at the specified date and time. For example, by using the example prompt above, the generative ML model may edit an image of the Golden Gate Bridge on a sunny day at noon to match the lighting conditions of a cloudy day at sunset.

In some implementations, the generative ML model may further modify the image. For example, the model may modify a photograph to be in a cartoon style. In another example, the method may turn a static image into an animation. For example, the method may turn a still image of the Golden Gate Bridge in the sunshine into a cartoon of the Golden Gate Bridge with animated raindrops.

In one implementation, the method may constrain the model to avoid offensive output. For example, the method may only provide the model with training data that lacks offensive content and/or may use negative prompting (e.g., specifying elements to exclude). For example, if the current weather conditions include wildfire smoke, the method may exclude images of burn injuries from being included in the generated image.

Example Prompt: Edit the attached image with smoke, floating ashes, floating sparks, dark skies, dim, overcast, yellow light, orange light, realistic, photograph, high resolution,—burn—injury—casualty—victim In some implementations, the method may generate the image of the landmark based on multiple input images of the landmark. For example, the generative ML model may be trained on multiple images of a landmark such as the Eiffel Tower and may thereafter be capable of generating new images of the Eiffel Tower under various weather conditions and/or from various angles, distances, and/or perspectives.

In step 210, the method can include causing display, by the processor, of the digital image in an application.

In some implementations, causing display of the digital image in the application may include transmitting, by the processor, the digital image to a mobile device that displays the digital image in the application. For example, the method may be executed on a server and may transmit the digital image to a user's mobile device. Alternatively, the method may be hosted on a user's mobile device and may display the image directly.

Figure 3:
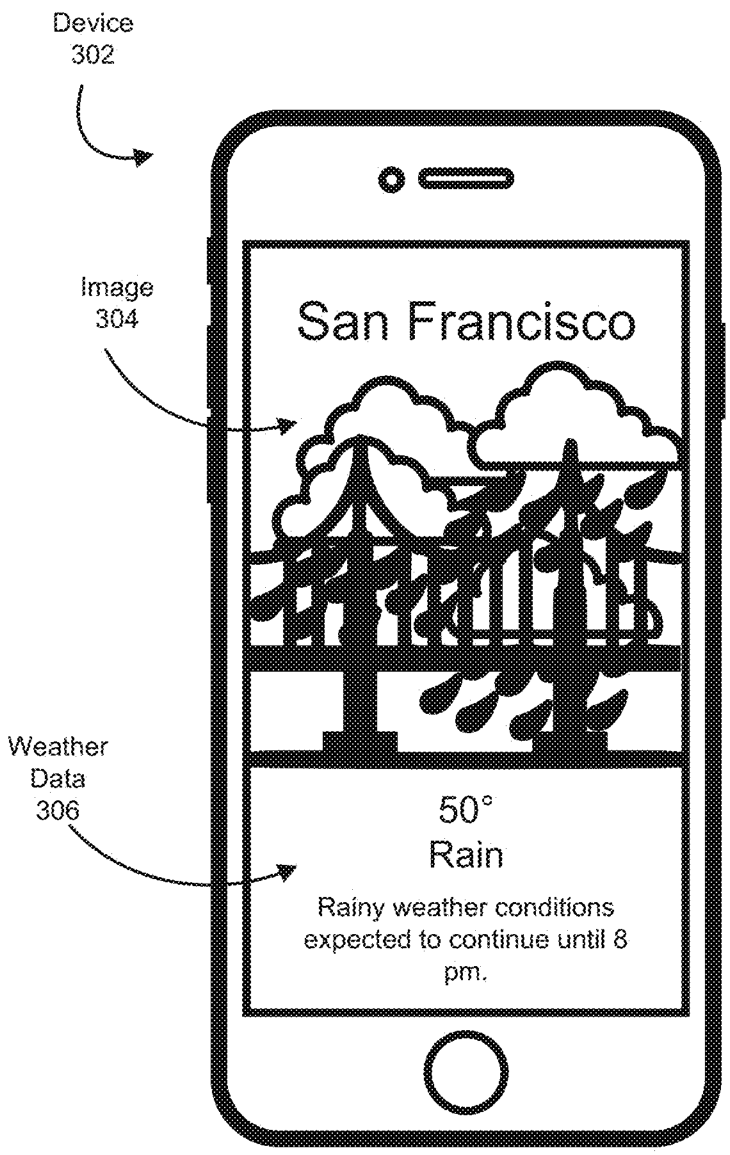
FIG. 3 is an illustration of a system for generating images of locations affected by weather conditions according to some of the example embodiments.

In some implementations, displaying the digital image in the application may include displaying the digital image in a weather application alongside data about the weather condition at the geographic location. For example, as illustrated in FIG. 3, a device 302 may be configured with and/or receive data from the method and may display a digital image 304 of a location visibly affected by a weather condition alongside weather data 306. In one example, the rain clouds in digital image 304 may have been added by the method providing data to a generative ML model.

Figure 4:
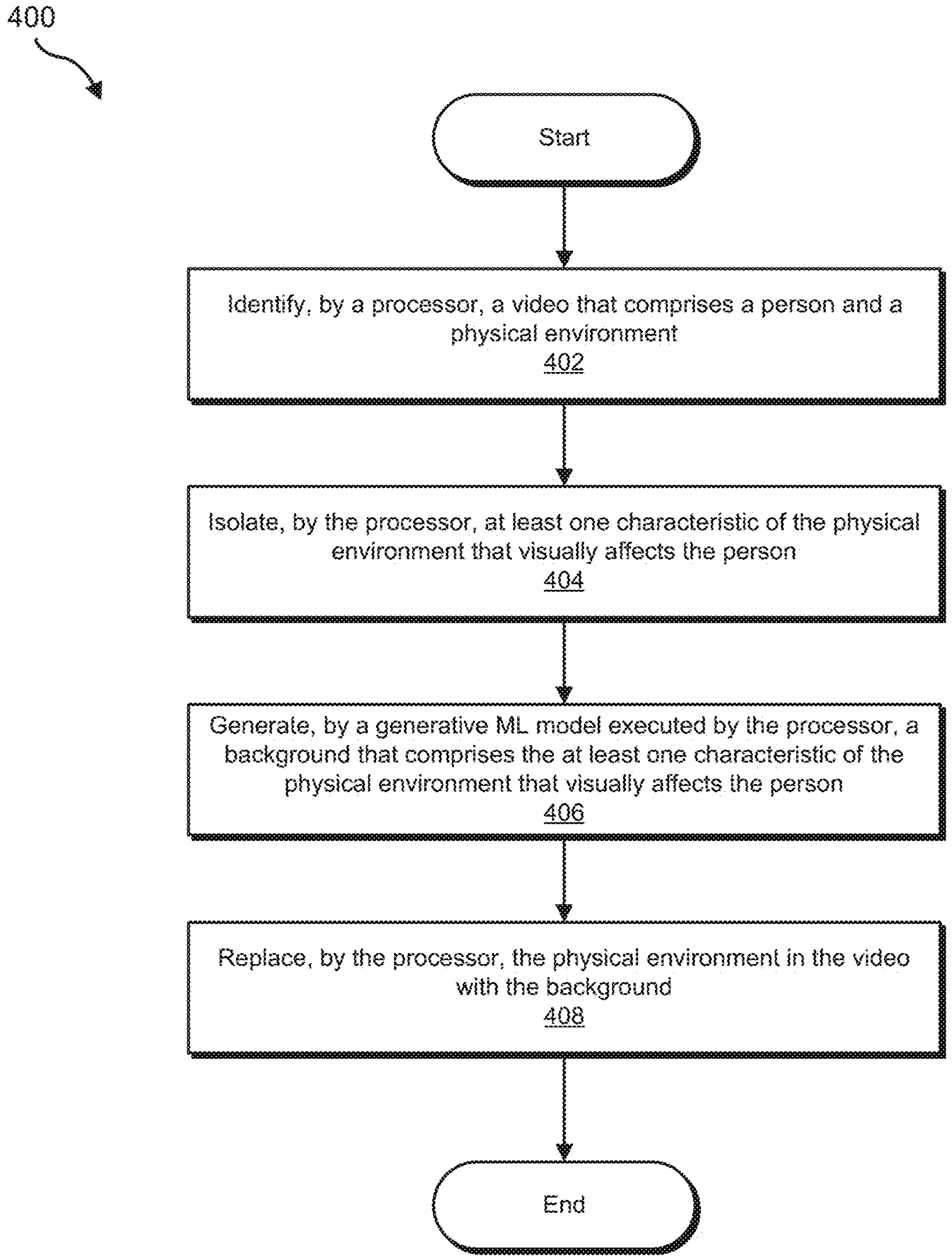
FIG. 4 is a flow diagram illustrating a method generating images via generative machine learning models according to some of the example embodiments.

FIG. 4 is a flow diagram illustrating a method 400 for generating images via generative machine learning models according to some of the example embodiments.

In step 402, the method can include identifying, by a processor, a video that comprises a person and a physical environment.

Figure 5:
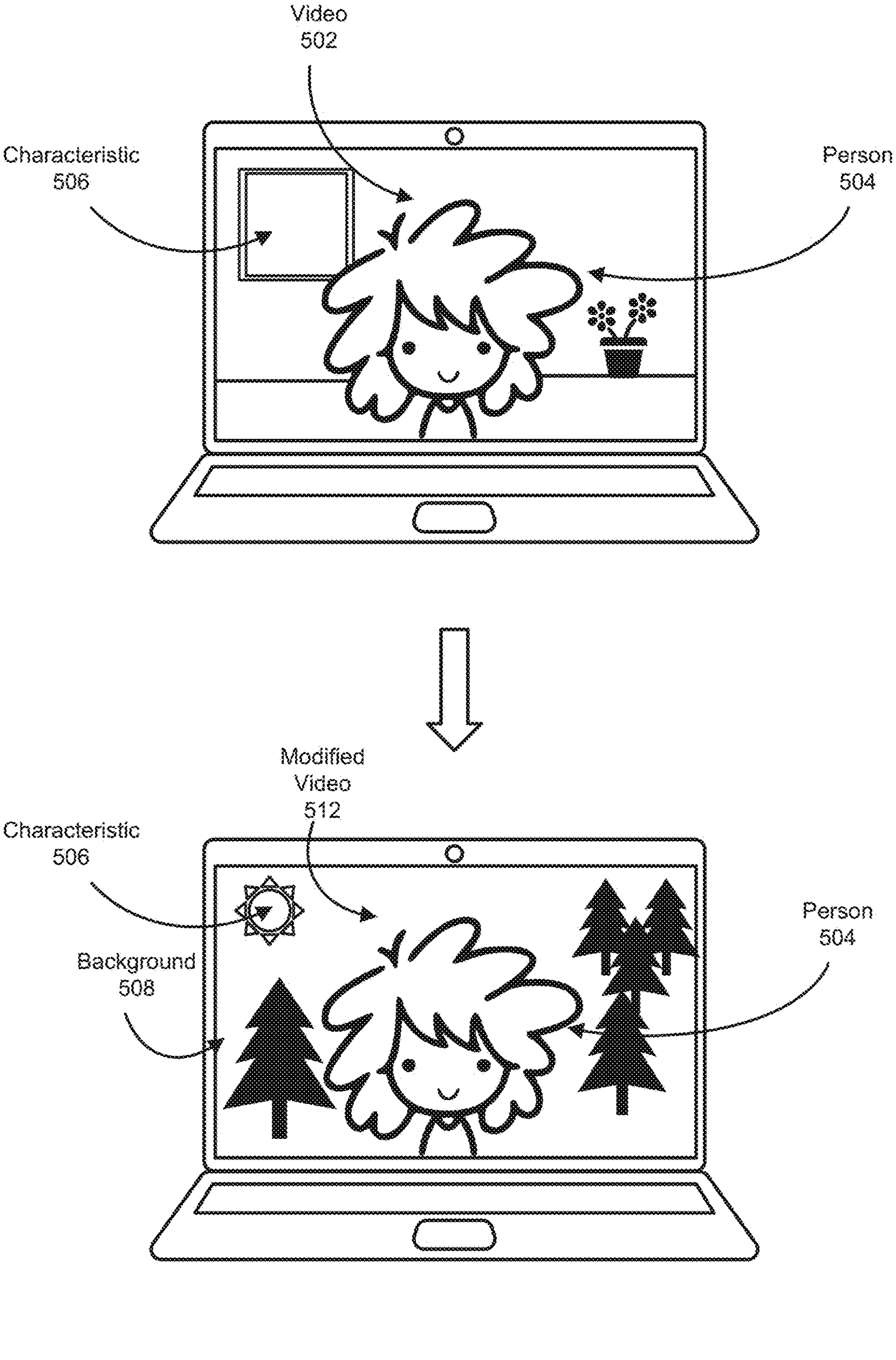
FIG. 5 is an illustration of a system for generating images via generative machine learning models according to some of the example embodiments.

In some implementations, the method may identify a video that is part of a video conference or video call. For example, the method may identify a video of a person sitting at a desk in a home office that is being streamed as part of a video conference. In one example, as illustrated in FIG. 5, the method may identify a video 502 that includes a person 504 in a physical environment that includes a room with a window, plants, and various other features.

Returning to FIG. 4, in step 404, the method can include isolating, by the processor, at least one characteristic of the physical environment that visually affects the person.

The method may isolate various types of characteristics. For example, the method may isolate a level of light in the physical environment (e.g., brightly lit, dim, etc.). In some examples, the method may isolate a direction of light source and/or a color of light. In one example, as illustrated in FIG. 5, the method may identify a characteristic 506 that includes a window behind person 504 that functions as a light source above and to the right of person 504.

In some implementations, the method may isolate characteristics having to do with the person's positioning. For example, if the person is towards the left side of the video frame, the method may isolate this characteristic in order to avoid generating a background where important details (e.g., words, logos, etc.) are to the left side of the video frame.

Various techniques can be employed to perform the above-described isolation. As one example, the method can utilize edge detection (e.g., using a Canny or Sobel algorithm) to identify edges and a segmentation model (e.g., U-Net or Mask R-CNN) to separate objects from a background. In some implementations, a shading analysis can be performed to analyze the shading of objects, and, in some implementations, a convolutional neural network (CNN) can be used to predict the direction of light based on the processed video frames. In some implementations, a color balance or white balance algorithm can be used to understand the dominant colors and their intensities in certain regions of the image. In some implementations, edge detection and segmentation can be used to prepare features for later image analysis as described.

Returning to FIG. 4, in step 406, the method can include generating, by a generative ML model executed by the processor, a background that comprises at least one characteristic of the physical environment that visually affects the person.

The method may generate various types of backgrounds in various ways. In some implementations, the method may pull from a library of pre-existing backgrounds and then modify the pre-existing background with the characteristic. Additionally, or alternatively, the method may generate a background via an algorithm, such as a generative ML model. For example, the method may provide the video, the characteristic, and/or an additional text and/or image or video prompt to the generative ML model. In one implementation, the method may provide a screenshot of the video to the generative ML model as part of a prompt.

Example Prompt: Create an image of a forest during the day with the sun at the top left of the frame generating natural light.

In some implementations, the method may use a large language model (LLM) to create a prompt for the generative ML model based on the context of the video. For example, the method may provide a transcript of recent text from the video as input to the LLM to generate a prompt for the generative ML model to create a relevant background. In one example, the method may capture a transcript of the video that includes a discussion of camping in a forest and may generate a background of a forest. In another example, the method may capture a transcript of the video that includes a discussion of sports, summarize the transcript via the LLM, and provide a prompt to the generative ML model that produces a background with sports logos for the relevant teams. In some implementations, the method may generate a static background. In some implementations, the method may generate an animated and/or video background.

In step 408, the method can include replacing, by the processor, the physical environment in the video with the background.

In some implementations, the generative ML model may generate a video that features the person in front of the background and may send that video as a replacement for the original video to any application using and/or streaming the video. For example, the method may replace a user's video stream for a video conference with the version of the video that includes the generated background. Additionally, or alternatively, the method may replace the physical environment with the background by segmenting out the person and pasting the person on the background. In some implementations, the method may generate the background once. Alternatively, the method may re-generate the background periodically (e.g., as conditions within the video change, as new subjects are discussed, as the person moves within the frame, etc.). In some examples, the method may generate a short animation and then cycle the animation as part of the background.

In some implementations, by ensuring that the generated background has the characteristics of the physical environment that visually affect the person, the method may reduce distracting visual distortions that often plague virtual backgrounds. For example, the method may match the light source in the generated background to the light source in the original physical environment. In one example, as illustrated in FIG. 5, the method may produce a modified video 512 that includes person 504 in front of a background 508 of a forest that includes the same characteristic 506 of the original physical environment by placing the sun above and to the right of the user, keeping the light source consistent.

Although described separately, in some implementations, steps 406 and 408 may be performed as a single step. For example, a generative ML model may generate a new video that consists of the video of the person with the generated background as the background, rather than separately generating the new background and then adding in the video of the person.

Figure 6:
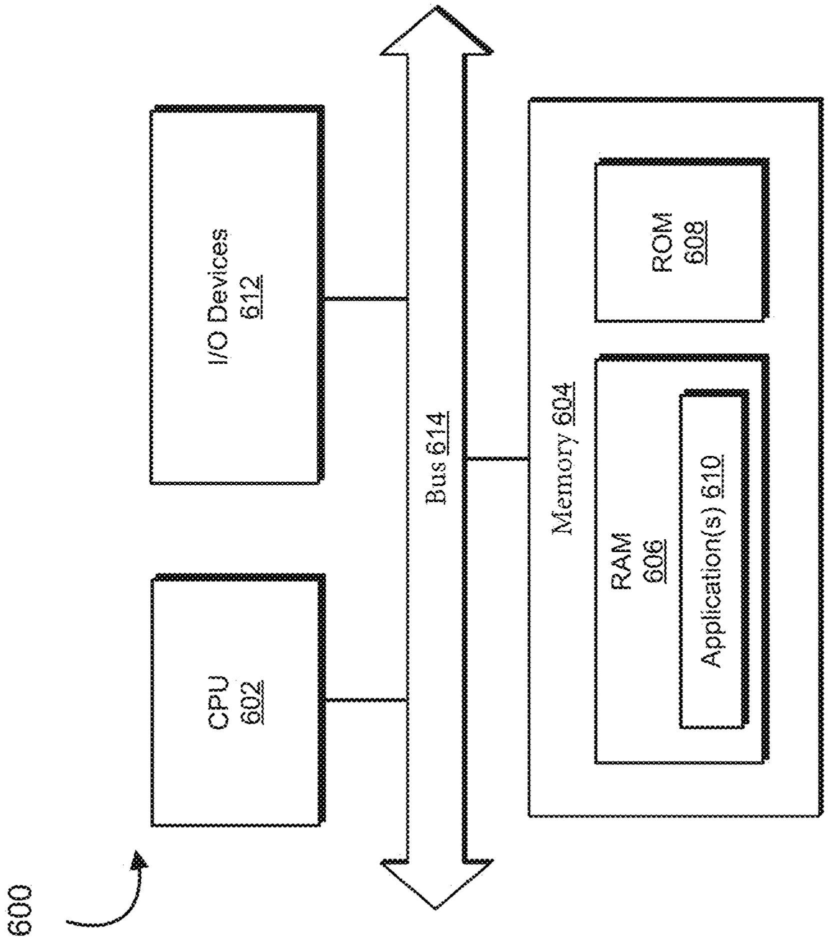
FIG. 6 is a block diagram of a computing device according to some embodiments of the disclosure.

FIG. 6 is a block diagram of a computing device according to some embodiments of the disclosure.

As illustrated, the device 600 includes a processor or central processing unit (CPU) such as CPU 602 in communication with a memory 604 via a bus 614. The device also includes one or more input/output (I/O) or peripheral devices 612. Examples of peripheral devices include, but are not limited to, network interfaces, audio interfaces, display devices, keypads, mice, keyboard, touch screens, illuminators, haptic interfaces, GPS receivers, cameras, or other optical, thermal, or electromagnetic sensors.

In some embodiments, the CPU 602 may comprise a general-purpose CPU. The CPU 602 may comprise a single-core or multiple-core CPU. The CPU 602 may comprise a system-on-a-chip (SoC) or a similar embedded system. In some embodiments, a graphics processing unit (GPU) may be used in place of or in combination with, a CPU 602. Memory 604 may comprise a memory system including a dynamic random-access memory (DRAM), static random-access memory (SRAM), Flash (e.g., NAND Flash), or combinations thereof. In one embodiment, the bus 614 may comprise a Peripheral Component Interconnect Express (PCIe) bus. In some embodiments, the bus 614 may comprise multiple busses instead of a single bus.

Memory 604 illustrates an example of a non-transitory computer storage media for the storage of information such as computer-readable instructions, data structures, program modules, or other data. Memory 604 can store a basic input/output system (BIOS) in read-only memory (ROM), such as ROM 608 for controlling the low-level operation of the device. The memory can also store an operating system in random-access memory (RAM) for controlling the operation of the device.

Applications 610 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 606 by CPU 602. CPU 602 may then read the software or data from RAM 606, process them, and store them in RAM 606 again.

The device may optionally communicate with a base station (not shown) or directly with another computing device. One or more network interfaces in peripheral devices 612 are sometimes referred to as a transceiver, transceiving device, or network interface card (NIC).

An audio interface in peripheral devices 612 produces and receives audio signals such as the sound of a human voice. For example, an audio interface may be coupled to a speaker and microphone (not shown) to enable telecommunication with others or generate an audio acknowledgment for some action. Displays in peripheral devices 612 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 612 may comprise any input device arranged to receive input from a user. An illuminator in peripheral devices 612 may provide a status indication or provide light. The device can also comprise an input/output interface in peripheral devices 612 for communication with external devices, using communication technologies, such as USB, infrared, Bluetooth®, or the like. A haptic interface in peripheral devices 612 provides tactile feedback to a user of the client device.

A GPS receiver in peripheral devices 612 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 6, depending on the deployment or usage of the device. For example, a server computing device, such as a rack-mounted server, may not include audio interfaces, displays, keypads, illuminators, haptic interfaces, GPS receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:

identifying, by a processor, a geographic location and a current time;

retrieving, by the processor from a database, a weather condition of the geographic location at the current time;

retrieving, by the processor from an image database, a photographic image of a real-world scene based on the geographic location;

performing, by the processor, at least one automatic prompt engineering step that outputs a prompt in a predefined structured format, the prompt comprising the weather condition;

creating, via a generative machine learning model executed by the processor that takes the photographic image of the geographic location and the prompt in the predefined structured format as input, a digital image depicting the geographic location being visibly affected by the weather condition, wherein the generative machine learning model is configured to receive structured input that comprises the weather condition, and wherein the generative machine learning model modifies visual characteristics of physical structures and natural features present in the photographic image to reflect effects of the weather condition; and causing display, by the processor, of the digital image in an application.

2. The method of claim 1, wherein the structured input comprises a specified day of the year and a specified time of day.

3. The method of claim 1, wherein the structured input comprises a specified color palette.

4. The method of claim 1, wherein the prompt further comprises a specified day of the year and a specified time of day.

5. The method of claim 1, wherein creating the digital image comprises creating a cartoon version of the digital image.

6. The method of claim 1, wherein creating the digital image comprises creating an animated version of the digital image.

7. The method of claim 1, wherein retrieving the photographic image based on the geographic location comprises querying locally stored photographic images related to the geographic location.

8. The method of claim 1, wherein creating, via the generative machine learning model executed by the processor that takes the photographic image of the geographic location and the weather condition as input, the digital image, comprises constraining the generative machine learning model to avoid offensive output.

9. A non-transitory computer-readable storage medium for tangibly storing computer program instructions capable of being executed by a computer processor, the computer program instructions defining steps of:

identifying, by a processor, a geographic location and a current time;

retrieving, by the processor from a database, a weather condition of the geographic location at the current time;

retrieving, by the processor from an image database, a photographic image of a real-world scene based on the geographic location;

performing, by the processor, at least one automatic prompt engineering step that outputs a prompt in a predefined structured format, the prompt comprising the weather condition;

creating, via a generative machine learning model executed by the processor that takes the photographic image of the geographic location and the prompt in the predefined structured format as input, a digital image depicting the geographic location being visibly affected by the weather condition, wherein the generative machine learning model is configured to receive structured input that comprises the weather condition, and wherein the generative machine learning model modifies visual characteristics of physical structures and natural features present in the photographic image to reflect effects of the weather condition; and causing display, by the processor, of the digital image in an application.

10. The non-transitory computer-readable storage medium of claim 9, wherein the structured input comprises a specified day of the year and a specified time of day.

11. The non-transitory computer-readable storage medium of claim 9, wherein the structured input comprises a specified color palette.

12. The non-transitory computer-readable storage medium of claim 9, wherein the prompt further comprises a specified day of the year and a specified time of day.

13. The non-transitory computer-readable storage medium of claim 9, wherein creating the digital image comprises creating a cartoon version of the digital image.

14. The non-transitory computer-readable storage medium of claim 9, wherein creating the digital image comprises creating an animated version of the digital image.

15. The non-transitory computer-readable storage medium of claim 9, wherein retrieving the photographic image based on the geographic location comprises querying locally stored photographic images related to the geographic location.

16. The non-transitory computer-readable storage medium of claim 9, wherein creating, via the generative machine learning model executed by the processor that takes the photographic image of the geographic location and the weather condition as input, the digital image, comprises constraining the generative machine learning model to avoid offensive output.

17. A device comprising:

a processor; and a storage medium for tangibly storing thereon logic for execution by the processor, the logic comprising instructions for:

identifying, by the processor, a geographic location and a current time;

retrieving, by the processor from a database, a weather condition of the geographic location at the current time;

retrieving, by the processor from an image database, a photographic image of a real-world scene based on the geographic location;

performing, by the processor, at least one automatic prompt engineering step that outputs a prompt in a predefined structured format, the prompt comprising the weather condition;

creating, via a generative machine learning model executed by the processor that takes the photographic image of the geographic location and the prompt in the predefined structured format as input, a digital image depicting the geographic location being visibly affected by the weather condition, wherein the generative machine learning model is configured to receive structured input that comprises the weather condition, and wherein the generative machine learning model modifies visual characteristics of physical structures and natural features present in the photographic image to reflect effects of the weather condition; and causing display, by the processor, of the digital image in an application.

* * * * *